US009558496B2

(12) United States Patent
Chakra et al.

(10) Patent No.: US 9,558,496 B2
(45) Date of Patent: Jan. 31, 2017

(54) ACCESSING TRANSACTION DOCUMENTS

(71) Applicant: International Business Machines Corporation, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 547 days.

(21) Appl. No.: 13/872,540

(22) Filed: Apr. 29, 2013

(65) Prior Publication Data

US 2014/0319206 A1 Oct. 30, 2014

(51) Int. Cl.
*G06F 17/00* (2006.01)
*G06Q 30/00* (2012.01)

(52) U.S. Cl.
CPC .................................... *G06Q 30/00* (2013.01)

(58) Field of Classification Search
None
See application file for complete search history.

(56) References Cited

U.S. PATENT DOCUMENTS

| | | | |
|---|---|---|---|
| 5,509,071 | A | 4/1996 | Petrie, Jr. et al. |
| 5,832,464 | A | 11/1998 | Houvener et al. |
| 5,975,275 | A | 11/1999 | Keith et al. |
| 6,129,274 | A | 10/2000 | Suzuki |
| 6,327,576 | B1 | 12/2001 | Ogasawara |
| 6,394,341 | B1 | 5/2002 | Makipaa et al. |
| 6,439,345 | B1 | 8/2002 | Recktenwald et al. |
| 6,487,540 | B1 | 11/2002 | Smith et al. |
| 6,577,861 | B2 | 6/2003 | Ogasawara |

(Continued)

FOREIGN PATENT DOCUMENTS

| | | | |
|---|---|---|---|
| EP | 0474360 | A2 | 3/1992 |
| JP | 2001175752 | A | 6/2001 |
| WO | 9922327 | | 5/1999 |

OTHER PUBLICATIONS

Kooijmans, AL. et al.; "Transaction Processing: Past, Present, and Future"; www.ibm.com/redbooks/redp4854-00 . . . ; IBM Corporation 2012, 65 pages.

(Continued)

*Primary Examiner* — Michael G Lee
*Assistant Examiner* — Tabitha Chedekel
(74) *Attorney, Agent, or Firm* — DeLio, Peterson & Curcio, LLC; David R. Pegnataro

(57) ABSTRACT

According to one embodiment of the present invention, a system accesses transaction documents. A unique code is generated for each transaction for one or more products, wherein the unique code is associated with a transaction document including transaction information and each product is associated with a product code. The system stores the unique code and corresponding one or more product codes associated with each transaction, and accesses one or more transaction documents based on an identifier of at least one product associated with a corresponding transaction of the one or more transaction documents. Embodiments of the present invention further include a method and computer program product for accessing transaction documents in substantially the same manners described above.

16 Claims, 8 Drawing Sheets

(56) References Cited

U.S. PATENT DOCUMENTS

| | | | |
|---|---|---|---|
| 6,898,598 B2 | 5/2005 | Himmel et al. | |
| 2003/0028451 A1* | 2/2003 | Ananian | G06F 17/30867 705/26.42 |
| 2003/0033272 A1 | 2/2003 | Himmel et al. | |
| 2009/0271265 A1 | 10/2009 | Lay et al. | |
| 2012/0284130 A1 | 11/2012 | Lewis et al. | |
| 2012/0290609 A1* | 11/2012 | Britt | G06Q 30/06 707/769 |
| 2014/0188647 A1* | 7/2014 | Argue | G06Q 30/0601 705/26.1 |

OTHER PUBLICATIONS

Anonymous; "A Process to Store and Recover a Cloud Computing Environment"; http://priorartdatabase.com/IPCOM/000213416; IP.com, Dec. 14, 2011, 3 pages.

Alletronic; "Your paperless convenience"; http://www.tedwin.com/ecents/; accessed Apr. 17, 2013, 9 pages.

Steiner, Ina; "Amazon Uses Image Recognition and Barcode Reader in New iPhone App"; http://www.ecommercebytes.com/cab/abn/y11/m11/i03/s04; EcommerceBytes.com, Nov. 3, 2011, 1 page.

* cited by examiner

ACCESSING TRANSACTION DOCUMENTS

BACKGROUND

1. Technical Field

Present invention embodiments relate to accessing transaction documents, and, in particular, to accessing receipts for retail transactions.

2. Discussion of the Related Art

When a customer purchases items at a retail store, a point of sale (POS) system typically scans the Universal Product Code (UPC) or other barcode of the items and generates a receipt, typically a paper receipt. The customer may have to save the receipt and provide it to the retailer or manufacturer in order to return the item or have an item under warranty repaired. Further, an original receipt or a gift receipt may be required to return an item received as a gift. However, storing numerous paper receipts may be overwhelming, and typically leads to receipts becoming lost, and items becoming un-returnable.

BRIEF SUMMARY

According to one embodiment of the present invention, a system accesses transaction documents. A unique code is generated for each transaction for one or more products, wherein the unique code is associated with a transaction document including transaction information and each product is associated with a product code. The system stores the unique code and corresponding one or more product codes associated with each transaction, and accesses one or more transaction documents based on an identifier of at least one product associated with a corresponding transaction of the one or more transaction documents. Embodiments of the present invention further include a method and computer program product for accessing transaction documents in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
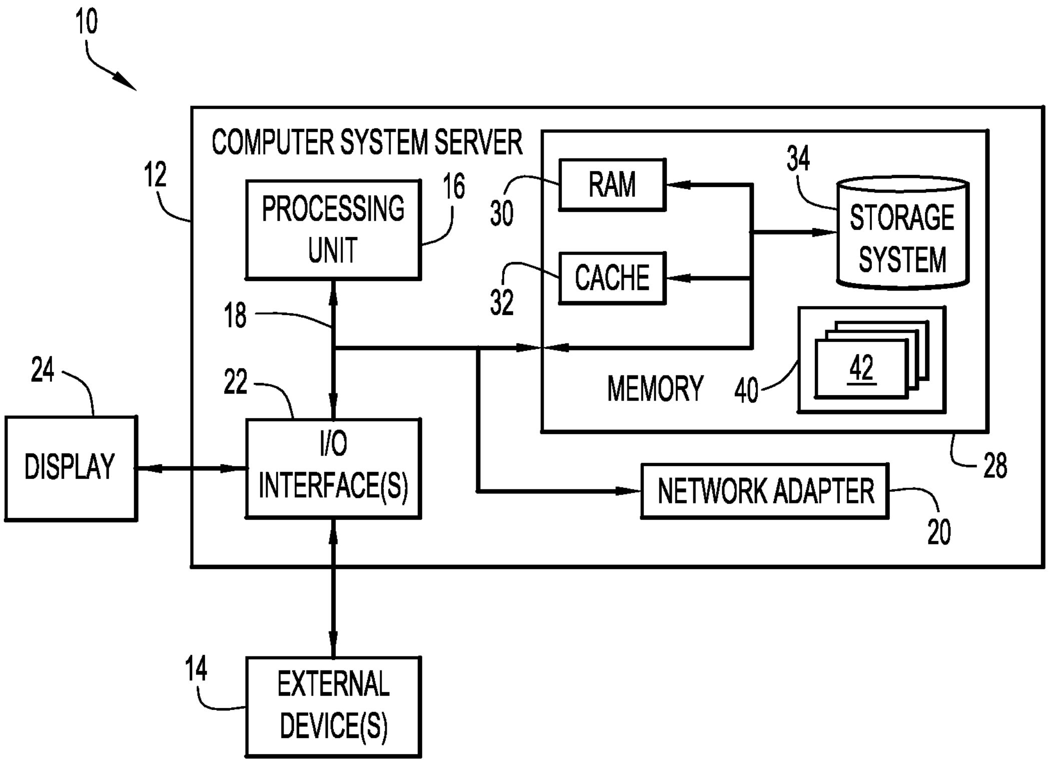
FIG. 1 depicts a cloud computing node according to an embodiment of the present invention.

Present invention embodiments relate to storing and retrieving transaction documents. For example, a retailer generates a computer readable receipt for a customer in place of, or in addition to, a traditional paper receipt. The computer readable receipt is stored in a cloud computing system. The customer may accept the receipt via a computing device, e.g., a smart phone, which sends the receipt to the cloud system for future reference. The receipt data is stored in the cloud system in a manner that allows the customer to easily access the receipt. For example, the customer can use a computing device to look up past purchases of an item for which a receipt is stored in the cloud system by scanning the Universal Product Code (UPC) of the item or by taking a picture of the item from which the item is identified using photo recognition technology. Once the device scans the item, it provides a list of receipts for purchases of the item, indicating, e.g., when and where each purchase occurred. The customer may provide information about one or more purchases to the retailer, manufacturer, or other as needed (e.g., to return the item or have an item under warranty repaired). The customer may enable another user of the system to access a receipt, or all receipts, for purchases made by the customer, e.g., when the item is purchased as a gift for the other user or if the other user is the customer's spouse.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include the following:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The cloud model Service Models may include the following:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
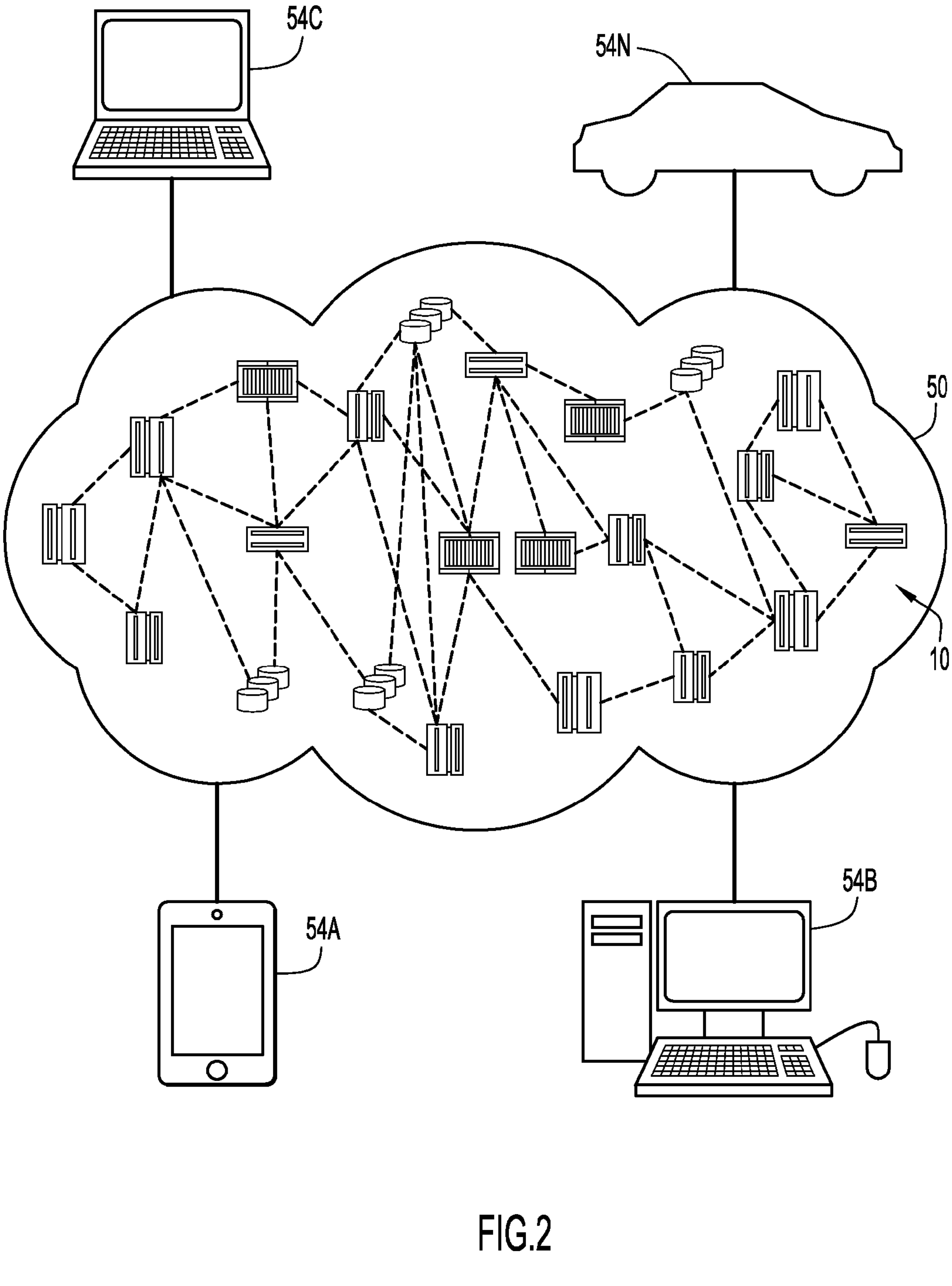
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers (such as, for example, personal digital assistant (PDA) or cellular telephone 54A, desktop computer 54B, laptop computer 54C, and/or automobile computer system 54N) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
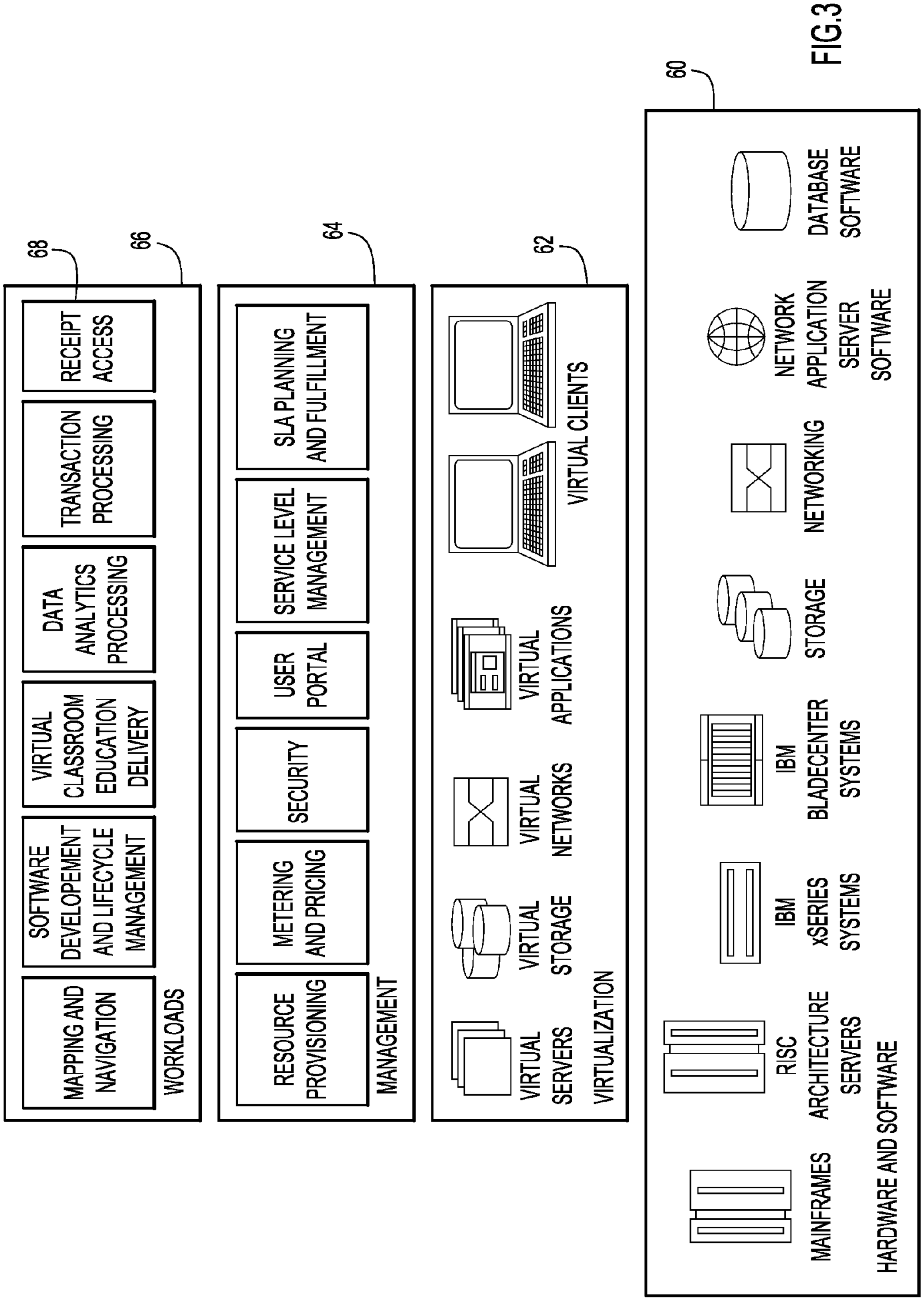
FIG. 3 depicts abstraction model layers according to an embodiment of the present invention

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and receipt access workload 68.

Figure 4:
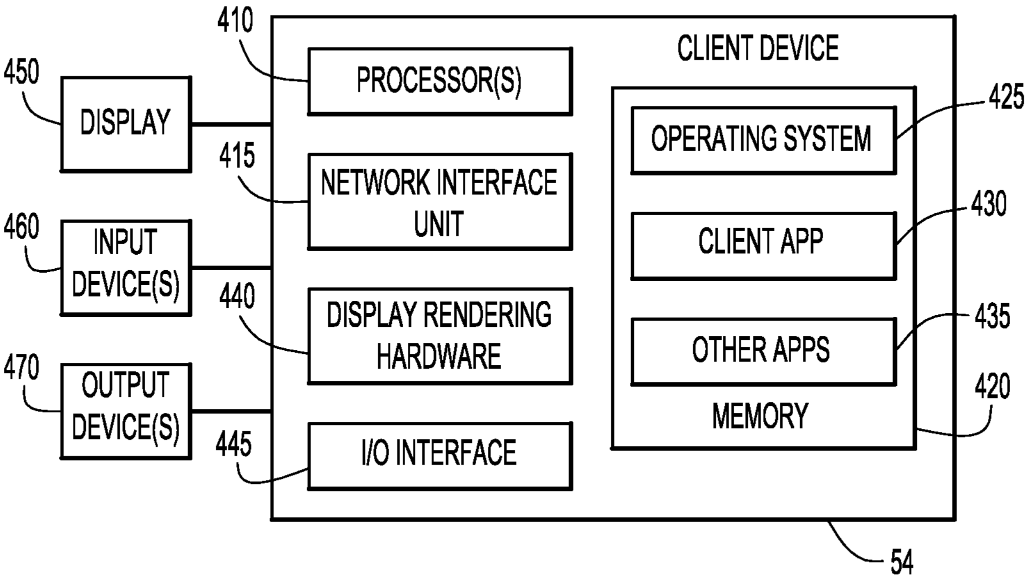
FIG. 4 depicts a block diagram of a client computing device for use with an embodiment of the present invention.

A block diagram of a client device 54 (e.g., local computing devices 54A-N) according to an embodiment of the present invention is illustrated in FIG. 4. The client device comprises one or more processors 410, a network interface unit 415, memory 420, display rendering hardware 440, and input/output interface 445. Resident in memory 420 are operating system 425, receipt client application 430, and optionally other applications 435. Receipt client application 430 can include one or more modules or units to perform various functions of present invention embodiments (e.g., scanning receipts; scanning barcodes of products; taking pictures of products; parsing scanned receipts; parsing scanned product barcodes; transmitting receipt information, product identifiers, pictures of products, user identifiers, or other information to the cloud system to store or retrieve receipts, grant another user access to a receipt, form network connections, managing user accounts, etc.) Client application 430 provides an interface such as a graphical user interface (GUI) for a user of the client device to interact with receipt access workload 68 of cloud computing system 50. Processor 410 is, for example, a data processing device such as a microprocessor, microcontroller, system on a chip (SOCs), or other fixed or programmable logic, that executes instructions for process logic stored in memory 420. Network interface unit 415 enables communication to cloud computing system 50. Memory 420 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Display rendering hardware 440 may be a part of processor 410, or may be, e.g., a separate Graphics Processor Unit (GPU).

I/O interface 445 enables communication between display device 450, input device(s) 460, and output device(s) 470, and the other components of the client device, and may enable communication with these devices in any suitable fashion, e.g., via a wired or wireless connection. The display device 450 may be any suitable display, screen or monitor capable of displaying information to a user of a client device, for example the screen of a smartphone or tablet or the monitor attached to a computer workstation. Input device(s) 460 may include any suitable input device, for example, a keyboard, mouse, trackpad, touch input tablet, touchscreen, camera, microphone, remote control, speech synthesizer, or the like. Output device(s) 470 may include any suitable output device, for example, a speaker, headphone, sound output port, or the like. The display device 450, input device(s) 460 and output device(s) 470 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

Figure 5:
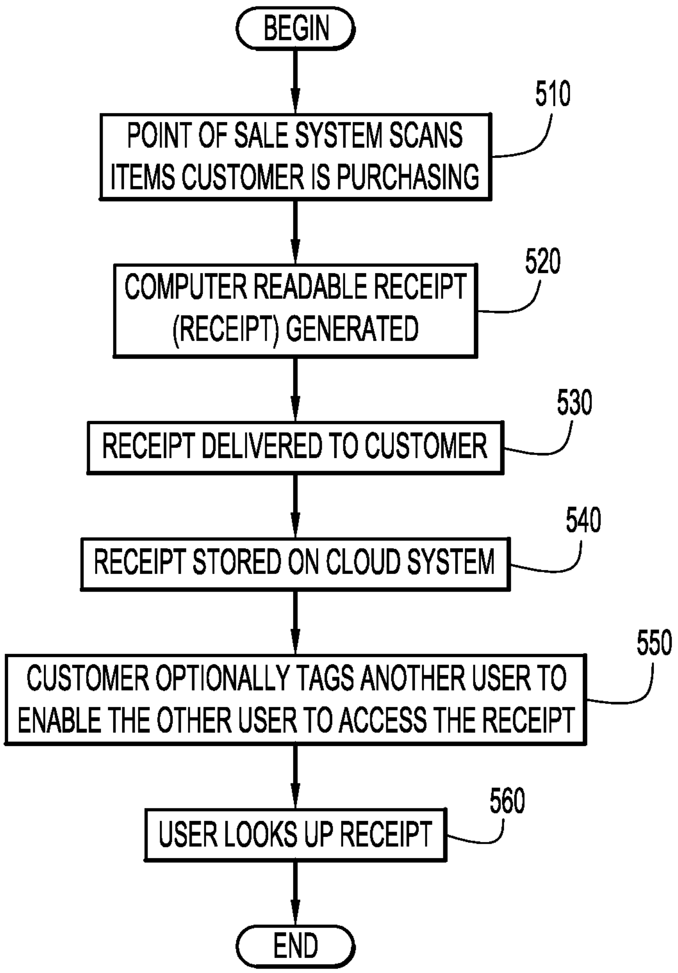
FIG. 5 depicts a procedural flow diagram of receipt access according to an embodiment of the present invention.
Figure 6:
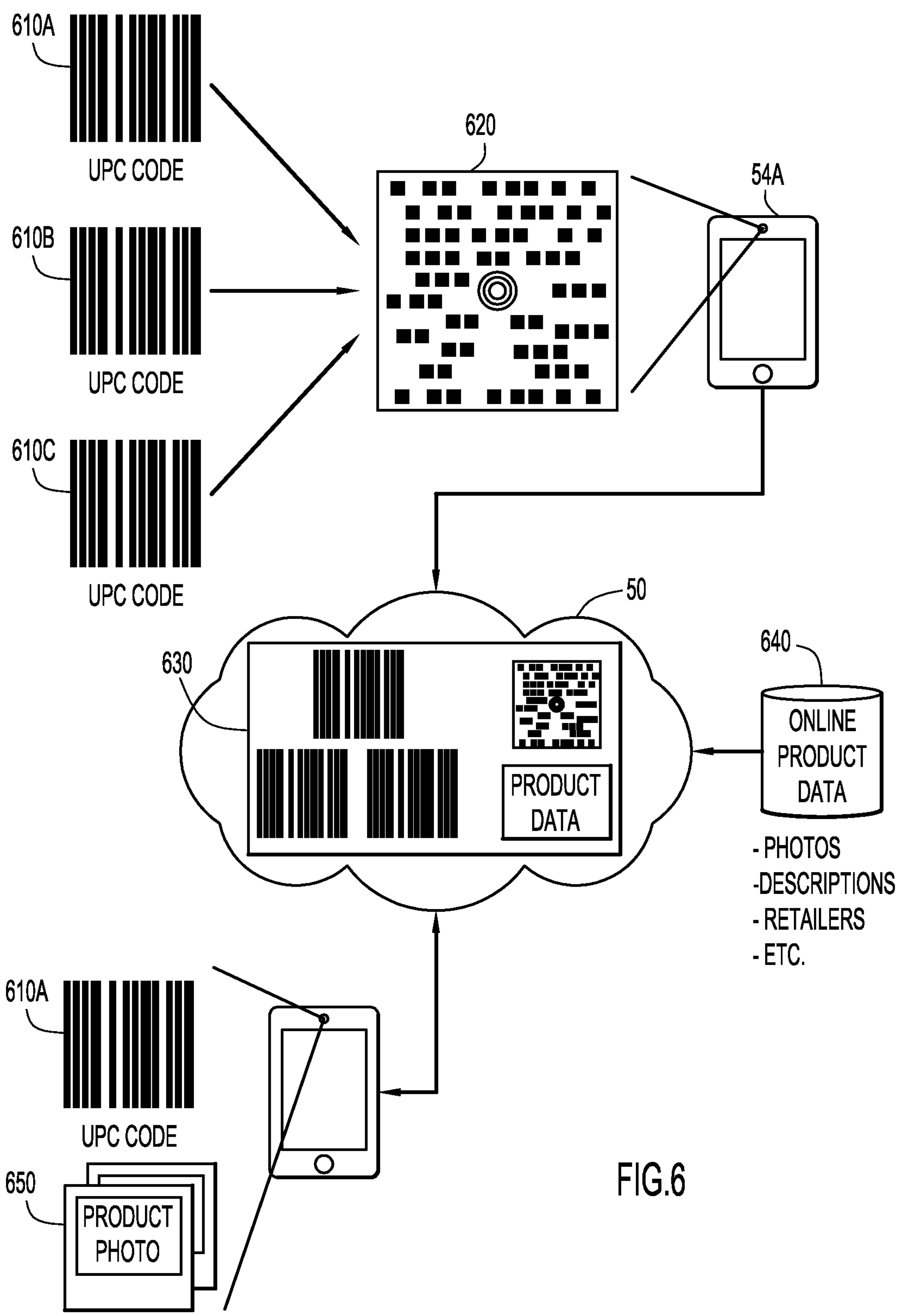
FIG. 6 depicts a schematic diagram of receipt access according to an embodiment of the present invention.

Storage and retrieval of receipts according to an embodiment of the present invention is illustrated in the procedural flow diagram of FIG. 5 and the schematic flow diagram of FIG. 6. Initially, at step 510, a Point of Sale (POS) computer system receives information about the items a customer is purchasing. For example, the POS may scan the items' Universal Product Code (UPC) 610A, 610B, 610C, or other barcode. The POS system generates a machine readable receipt at step 520. The POS generated machine readable receipt includes the time and location of the purchase, and, for each type of item purchased, a product identifier (e.g., the string of digits in the UPC), number, and price per item. The receipt can include a unique receipt identifier (e.g., a unique string of digits, number, etc.). The receipt can also include information that identifies the customer/user (e.g., determined from a credit card used by the customer, a membership card, phone number, etc.). Optionally, the POS system encrypts the receipt.

The receipt is delivered to the customer at step 530. For example, the POS system may generate and display a machine readable representation 620 (e.g., a Quick Response (QR) Code, other barcode, text, etc.) of the receipt on a credit card reader display, paper receipt, or other medium. The customer can scan the representation using an optical camera component of a client device (e.g., personal computing devices 54A-N). In one embodiment of the present invention, client application 430 parses the representation (e.g., decodes the QR code, performs optical character recognition of text, etc.) and sends the represented data to cloud system 50. In another embodiment of the present invention, the client application sends an image of the representation to the cloud system, and the cloud system decodes the image to extract the receipt data. The cloud system can decrypt an encrypted receipt. Alternatively, the customer may arrange with the retailer for the POS device to send the receipt data to the user's client device (e.g., to a local device of the user via a WAN, to a remote user device via the Internet, etc.). The receipt generated by POS may include the customer's user identifier. Alternatively, application 430 of the user's computing device may associate the user's identifier with the receipt for delivery to the cloud system. In one embodiment in which the retailer receives information that identifies the customer, the retailer can send the receipt and the customer's user identifier to the cloud system directly. At step 540, receipt data 630 is stored in the cloud system with the user's identifier for future reference.

The customer can "tag" another user at step 550 to enable the other user to access one or more items of the receipt (e.g., if an item was purchased for the other user). The other user will then have access to the receipt in that user's cloud environment. The POS may also store the receipt information in a local or remote system for future reference by the retailer. Alternatively, the customer tags the receipt for access by another user before transmitting the receipt to the cloud system.

A user can access a receipt at step 560. For example, a user can look up a receipt by scanning the UPC 610A or other barcode of a product (e.g., via an optical camera and client application 430 of client device 54A-N) to determine the product's identifier. The client application can send the identifier to receipt access workload 68 of cloud system 50 and request matching receipts.

In another example, a user can take a picture 650 of the item (e.g., via an optical camera of client device 54A-N) and have photo recognition technology compare the picture against other products to determine the product identifier and request matching receipts. For example, online product data 640 may include reference pictures of products, descriptions, retailers that offer the product, etc. The workload can access pictures of products for which receipts are stored in the system to determine products that match a user's picture with a predetermined level of confidence. In one embodiment, the workload determines matches via a module of modules 42 using a conventional or other image comparison algorithm. In another embodiment, the workload uses an external service to determine products matching the picture provided by the user.

The receipt access workload can return to the client device a list of receipts matching the product identifier and indicating when and where the product has been purchased. The user can provide the information to the retailer, manufacturer, or other as needed.

To improve performance and scalability, the receipt access workload can use a tiered search method to locate receipts for a given product identifier or image. The workload initially searches for matching products in receipts for the user's own purchases. If no matches are found, the search can expand to include products in receipts other users have tagged to allow the user access. For example, if a user takes a picture of a lamp, the workload can narrow down the list of lamps that it is searching for by comparing it to the ones in the user's own receipts, and then expanding the search to users that may have purchased the item for the user (i.e. tagged the user).

In one embodiment of the present invention, users of the system can establish connections to other users (e.g., spouses, family, business, etc.) to form networks, and the search for matches in receipts of other users can begin with receipts of other users connected directly to the user and expand outward from the user's immediate connections as needed.

Figure 7:
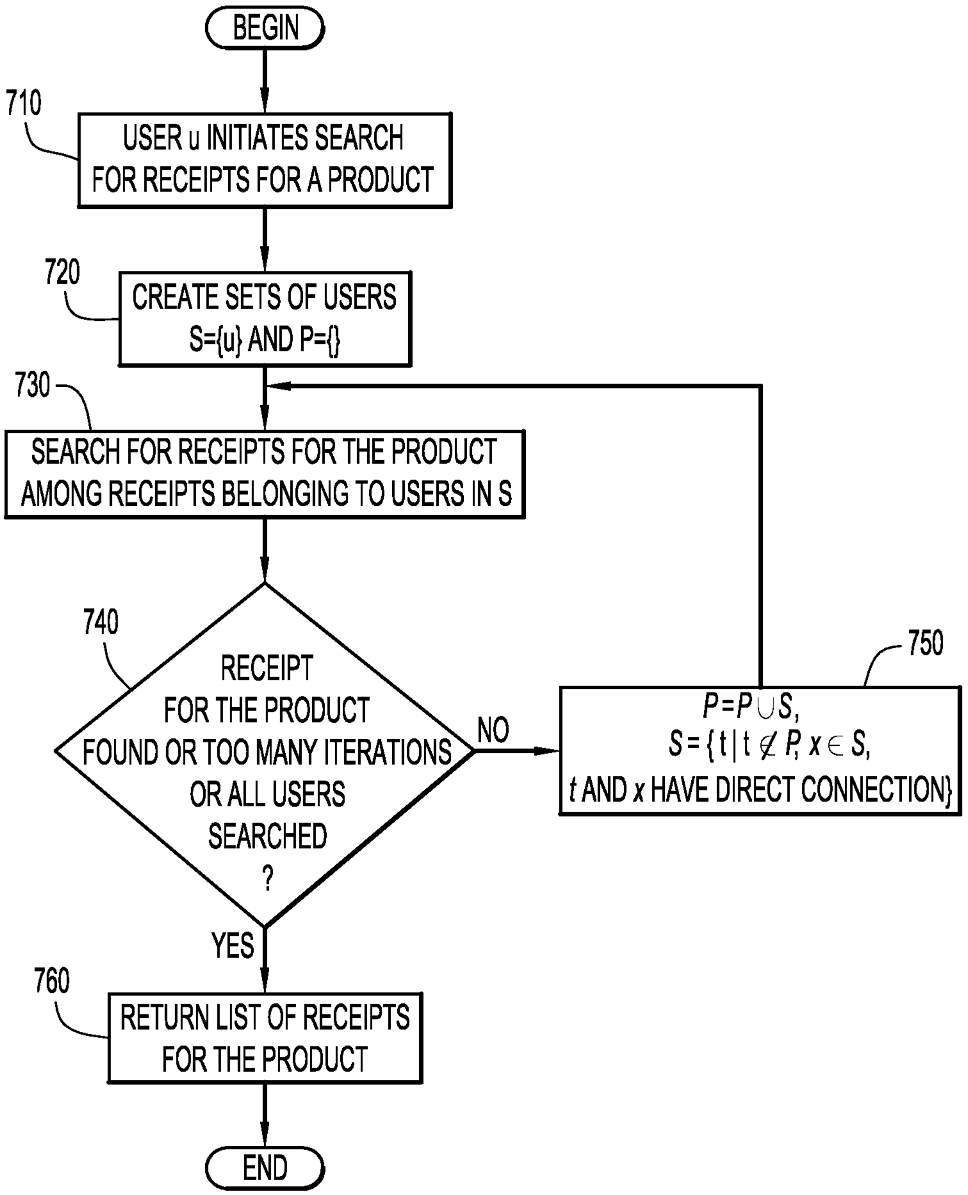
FIG. 7 depicts an example manner of performing a tiered search through a user's network of connections according to an embodiment of the present invention.

An example manner in which the receipt access workload performs a tiered search through a user's network of connections according to an embodiment of the present invention is illustrated in FIG. 7. A user initiates a search for receipts for a product at step 710. For example, the user may scan the product's UPC or take a picture of the product and send the product identifier encoded in the UPC or the picture to the receipt access workload. At step 720, the receipt access workload creates and initializes a set S of users whose receipts are to be searched for matches to the product and a set and P of users whose receipts have already been searched. Initially, S contains only the user submitting the request and P is empty.

At step 730, the workload searches the receipts belonging to each user in S for a match to the product. If user is searching for a match to an image of the product, the workload can restrict the domain of possible matching products to those in receipts of the users in S to limit the time consumed performing photo-recognition.

At step 740, the workload determines whether a receipt has been found for the product. If so, a list of the matching receipts is returned to the user at step 760 and processing ends. Otherwise, at step 750, the workload moves the users in S to P and reforms S to contain users directly connected to the former members of S, excluding those whose receipts have already been searched for matches to the product. Processing then returns to step 730, where matches are sought within the receipts of users in S. Processing can terminate at step 740 if a match is found or a predetermined stopping point is reached (e.g., a maximum number of connections removed form the user is reached, all users have been searched, etc.).

Figure 8:
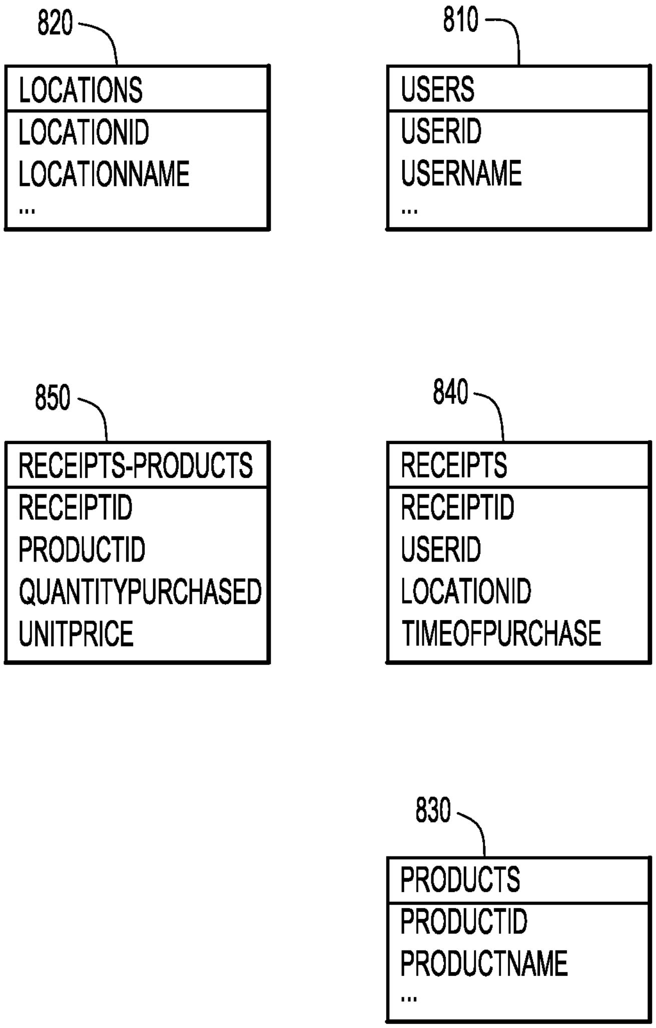
FIG. 8 depicts example tables for storing receipts for retrieval according to an embodiment of the present invention.

An example system for storing receipts for retrieval according to an embodiment of the present invention is a relational database comprising tables such as those depicted in FIG. 8. Users table 810 can include columns for UserID, UserName, etc., where UserID can be the primary key. Locations table 820 can include columns for LocationID, LocationName, etc., where LocationID can be the primary key. Products table 830 can include columns for ProductID, ProductName, etc., where ProductID can be the primary key. Receipt table 840 can include columns for ReceiptID, UserID, LocationID, and TimeOfPurchase, where ReceiptID can be the primary key, and UserID and LocationID are foreign keys to the Users and Locations tables respectively. The ReceiptID can be a unique receipt identifier generated by the POS system. Alternatively, the ReceiptID can be assigned by the workload. Receipts-Products table 850 can include columns for ReceiptID, ProductID, QuantityPurchased, and UnitPrice, to relate the products purchased in a given transaction to the corresponding receipt, where ReceiptID and ProductID are foreign keys to the Receipts and Products table respectively, QuantityPurchased is the number of items purchased and UnitPrice is the price per item in a given transaction. Tags table 860 can include columns for ReceiptID and OtherUserID, where ReceiptID is a foreign key to the Receipts table and OtherUserID is a foreign key to the Users table, indicating which users have been tagged by the purchaser to have access to the receipt. DirectConnections table 870 can include columns for UserID1 and UserID2, foreign keys to the Users table, to indicate users directly connected in a network.

It will be appreciated that the embodiments described above and illustrated in the drawings represent only a few of the many ways of implementing embodiments for accessing transaction documents.

The topology or environment of the present invention embodiments may include any number of computer or other processing systems, data storage systems, arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, local/end-user/client systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for accessing transaction documents of any kind (e.g., receipts for retail purchases, documentation of repairs or other services or agreements, etc.).

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises”, “comprising”, “includes”, “including”, “has”, “have”, “having”, “with” and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of accessing transaction documents comprising:

generating a unique code for each transaction for one or more products, wherein the unique code is associated with a transaction document including transaction information and each product is associated with a product code;

storing the unique code and corresponding one or more product codes associated with each transaction; and accessing one or more transaction documents based on an identifier of at least one product associated with a corresponding transaction of the one or more transaction documents, wherein accessing the one or more transaction documents includes a selected one of:

scanning a product code of one or more products to access the one or more transaction documents based on the one or more scanned product codes, and capturing an image of one or more products to access the one or more transaction documents based on the captured images.

2. The computer-implemented method of claim 1, wherein the transaction document includes a receipt.

3. The computer-implemented method of claim 1, wherein the unique code includes one of a bar code and a quick response code, and the product code includes a universal product code.

4. The computer-implemented method of claim 1, wherein generating the unique code includes:

identifying a recipient of one or more products of a transaction to enable the recipient to access a corresponding transaction document.

5. The computer-implemented method of claim 4, wherein accessing one or more transaction documents includes:

searching the transaction documents based on a user being a purchaser of one or more products of the corresponding transactions and a recipient of the one or more products purchased by another.

6. The computer-implemented method of claim 1, wherein the one or more transaction documents are accessed via a mobile device.

7. A system for accessing transaction documents comprising:

at least one processor configured to:

generate a unique code for each transaction for one or more products, wherein the unique code is associated with a transaction document including transaction information and each product is associated with a product code; store the unique code and corresponding one or more product codes associated with each transaction; and access one or more transaction documents based on an identifier of at least one product associated with a corresponding transaction of the one or more transaction documents, wherein accessing the one or more transaction documents includes a selected one of:

scanning a product code of one or more products to access the one or more transaction documents based on the one or more scanned product codes, and capturing an image of one or more products to access the one or more transaction documents based on the captured images.

8. The system of claim 7, wherein the transaction document includes a receipt, the unique code includes one of a bar code and a quick response code, and the product code includes a universal product code.

9. The system of claim 7, wherein at least one processor is further configured to:

identify a recipient of one or more products of a transaction to enable the recipient to access a corresponding transaction document.

10. The system of claim 9, wherein accessing one or more transaction documents includes:

searching the transaction documents based on a user being a purchaser of one or more products of the corresponding transactions and a recipient of the one or more products purchased by another.

11. The system of claim 7, wherein the one or more transaction documents are accessed via a mobile device.

12. A computer program product for accessing transaction documents comprising:

a computer readable storage medium having computer readable program code embodied therewith for execution on a first processing system, the computer readable program code comprising computer readable program code configured to:

generate a unique code for each transaction for one or more products, wherein the unique code is associated with a transaction document including transaction information and each product is associated with a product code;

store the unique code and corresponding one or more product codes associated with each transaction; and access one or more transaction documents based on an identifier of at least one product associated with a corresponding transaction of the one or more transaction documents, wherein accessing the one or more transaction documents includes a selected one of:

scanning a product code of one or more products to access the one or more transaction documents based on the one or more scanned product codes, and capturing an image of one or more products to access the one or more transaction documents based on the captured images.

13. The computer program product of claim 12, wherein the transaction document includes a receipt, the unique code includes one of a bar code and a quick response code, and the product code includes a universal product code.

14. The computer program product of claim 12, wherein the computer readable program code is further configured to:

identify a recipient of one or more products of a transaction to enable the recipient to access a corresponding transaction document.

15. The system of claim 14, wherein accessing one or more transaction documents includes:

searching the transaction documents based on a user being a purchaser of one or more products of the corresponding transactions and a recipient of the one or more products purchased by another.

16. The computer program product of claim 12, wherein the one or more transaction documents are accessed via a mobile device.

* * * * *